(12) United States Patent
Seo

(10) Patent No.: US 10,106,152 B2
(45) Date of Patent: Oct. 23, 2018

(54) SENSOR-BASED PARKING SPACE SEARCHING SYSTEM AND METHOD THEREOF

(71) Applicants: Hyundai Motor Company, Seoul (KR); Kia Motors Corporation, Seoul (KR)

(72) Inventor: Kwang Won Seo, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/603,748

(22) Filed: May 24, 2017

(65) Prior Publication Data

US 2018/0222470 A1    Aug. 9, 2018

(30) Foreign Application Priority Data

Feb. 6, 2017    (KR) .................. 10-2017-0016298

(51) Int. Cl.
*B60T 8/32* (2006.01)
*B60W 30/06* (2006.01)
*G01S 15/93* (2006.01)

(52) U.S. Cl.
CPC ........... *B60W 30/06* (2013.01); *G01S 15/931* (2013.01); *B60W 2420/54* (2013.01); *B60W 2550/10* (2013.01); *B60W 2720/10* (2013.01); *G01S 2015/932* (2013.01)

(58) Field of Classification Search
CPC combination set(s) only.
See application file for complete search history.

(56) References Cited

U.S. PATENT DOCUMENTS

| 6,525,656 | B1 * | 2/2003 | Hahn ...................... B60Q 1/44 |
| | | | 340/463 |
| 9,283,960 | B1 | 3/2016 | Lavoie |
| 2014/0316666 | A1 | 10/2014 | Bordes et al. |
| 2015/0032323 | A1 | 1/2015 | Nijakowski et al. |
| 2017/0227967 | A1 * | 8/2017 | Bariant ................ G05D 1/0212 |
| 2017/0242122 | A1 * | 8/2017 | Suzuki ................. G01S 15/931 |

FOREIGN PATENT DOCUMENTS

KR    10-2014-0078872 A    6/2014
KR    10-2016-0103208 A    9/2016

* cited by examiner

*Primary Examiner* — Adam M Alharbi
(74) *Attorney, Agent, or Firm* — Morgan, Lewis & Bockius LLP

(57) ABSTRACT

A sensor-based parking space searching system and a method thereof may include a switch receiving a request for searching for a parking space from a driver, an ultrasonic sensor searching for the parking space, and a controller activating the ultrasonic sensor in response to the request for searching for the parking space, setting a speed of an ego-vehicle and a reference value for detecting an effective detecting point of the ultrasonic sensor based on a distance from an object to the ego-vehicle, which is measured by the ultrasonic sensor, and recognizing the parking space based on an output of the ultrasonic sensor.

14 Claims, 4 Drawing Sheets

SENSOR-BASED PARKING SPACE SEARCHING SYSTEM AND METHOD THEREOF

CROSS-REFERENCE TO RELATED APPLICATION

The present application claims priority to Korean Patent Application No. 10-2017-0016298, filed on Feb. 6, 2017, the entire contents of which is incorporated herein for all purposes by this reference.

BACKGROUND OF THE INVENTION

Field of the Invention

The present invention relates to a sensor-based parking space searching system and a method thereof, and more particularly, to a technique capable of increasing a search range for a parking space by taking into account a correlation between factors used to search for the parking space when searching for the parking space.

Description of Related Art

In general, a parking assist (PA) system is a technology that assists drivers in parking their vehicles by utilizing sensors, such as, an ultrasonic sensor, a wheel sensor, a steering angle sensor, etc., to recognize a parking space and controlling a steering angle of the vehicle.

The PA system is activated when the driver puts the gear selector into a D (drive) mode and turns on a PA switch. The driver selects a parking mode (a right angle parking/a parallel parking) that he/she wants using a mode selection switch. Then, the vehicle moves forward while searching for a parking space available in the selected parking mode using the ultrasonic sensor, and when the available parking space is found, a searching end message is output along with a reverse gear transmission message. After this, the vehicle enters a control mode for parking, and the driver only controls the brake and the gear shifter.

In such a conventional PA system, there are some conditions set, such as, a distance between an ego-vehicle and a vehicle that is already parked is required to be maintained within about 1.5 meter, and a speed of the ego-vehicle is required to be maintained within about 20 km/h, when searching for the parking space.

In a case that the speed of the ego-vehicle exceeds about 20 km/h, a reception interval of signals (hereinafter, referred to as echo), which is transmitted from a transmitter of the ultrasonic sensor, reflected by an object, and received by a receiver of the ultrasonic sensor, i.e., an object detection interval of the ultrasonic sensor, becomes greater, thereby exceeding an error tolerance of about 30 cm in parking space searching. In addition, in a case that the distance between the ego-vehicle and the already-parked vehicle exceeds about 1.5 m, an intensity (voltage) of a signal reflected by a kerb in the parking space among the signals received by the receiver of the ultrasonic sensor drops under a critical value ($\alpha$), and thus it is difficult to accurately detect whether the object exists in the parking space.

Accordingly, the conventional PA system is not able to normally detect the parking space if the driver fails to satisfy the above-mentioned conditions when searching for the parking space.

In addition, since the conventional PA system requires to satisfy the above-mentioned conditions to normally detect the parking space, it causes inconvenience to the driver.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a sensor-based parking space searching system and a sensor-based parking space searching method, which are configured for normally searching for a parking space by adjusting a speed of an ego-vehicle and a sensitivity of an ultrasonic sensor provided to the ego-vehicle based on a distance (hereinafter, referred to as a "separation distance") between the ego-vehicle and another vehicle that is already parked when the parking space is searched such that a driver does not need to take into account the speed of the ego-vehicle and the separation distance.

The technical problems to be solved by the present inventive concept are not limited to the aforementioned problems, and any other technical problems not mentioned herein will be clearly understood from the following description by those skilled in the art to which the present invention pertains.

According to various aspects of the present invention, a sensor-based parking space searching system includes a switch that receives a request for searching for a parking space from a driver, an ultrasonic sensor that searches for the parking space, a controller that activates the ultrasonic sensor in response to the request for searching for the parking space, sets a speed of an ego-vehicle and a reference value for detecting an effective detecting point of the ultrasonic sensor based on a distance from an object to the ego-vehicle, which is measured by the ultrasonic sensor, and recognizes the parking space based on an output of the ultrasonic sensor.

The controller sets a first reference speed as the speed of the ego-vehicle and sets a first reference value ($\alpha$) as the reference value when the distance from the another vehicle to the ego-vehicle does not exceed a critical distance.

The controller sets a second reference speed as the speed of the ego-vehicle and sets a second reference value ($\beta$) as the reference value when the distance from the another vehicle to the ego-vehicle exceeds the critical distance.

The controller sets the second reference speed as the speed of the ego-vehicle and sets the second reference value ($\beta$) as the reference value to detect a kerb positioned at an end portion of the parking space.

The switch is disposed at one of a center fascia of the ego-vehicle, a spoke of a steering wheel, and a left dashboard of the steering wheel.

According to another aspect of the present invention, a sensor-based parking space searching method includes allowing a switch to receive a request for searching for a parking space from a driver, allowing an ultrasonic sensor to search for the parking space, allowing a controller to set a speed of an ego-vehicle and a reference value for detecting an effective detecting point of the ultrasonic sensor based on a distance from an object to the ego-vehicle, which is measured by the ultrasonic sensor, and allowing a controller to recognize the parking space based on an output of the ultrasonic sensor in which the reference value is set.

The setting the reference value includes setting a first reference speed as the speed of the ego-vehicle and a first reference value (α) as the reference value when the distance from the another vehicle to the ego-vehicle does not exceed a critical distance, and setting a second reference speed as the speed of the ego-vehicle and a second reference value (β) as the reference value when the distance from the another vehicle to the ego-vehicle exceeds the critical distance.

The setting the second reference value as the reference value includes setting the second reference speed as the speed of the ego-vehicle and the second reference value (β) as the reference value to detect a kerb positioned at an end portion of the parking space.

According to another aspect of the present invention, a sensor-based parking space searching system includes a parking space searching apparatus that activates an ultrasonic sensor in response to a request for searching for a parking space from a driver, sets a speed of an ego-vehicle and a reference value for detecting an effective detecting point of the ultrasonic sensor based on a distance from an object to the ego-vehicle, which is measured by the ultrasonic sensor, and recognizes the parking space based on an output of the ultrasonic sensor, and a parking assist (PA) system that controls a driving speed of the ego-vehicle based on the speed of the ego-vehicle set by the parking space searching apparatus.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
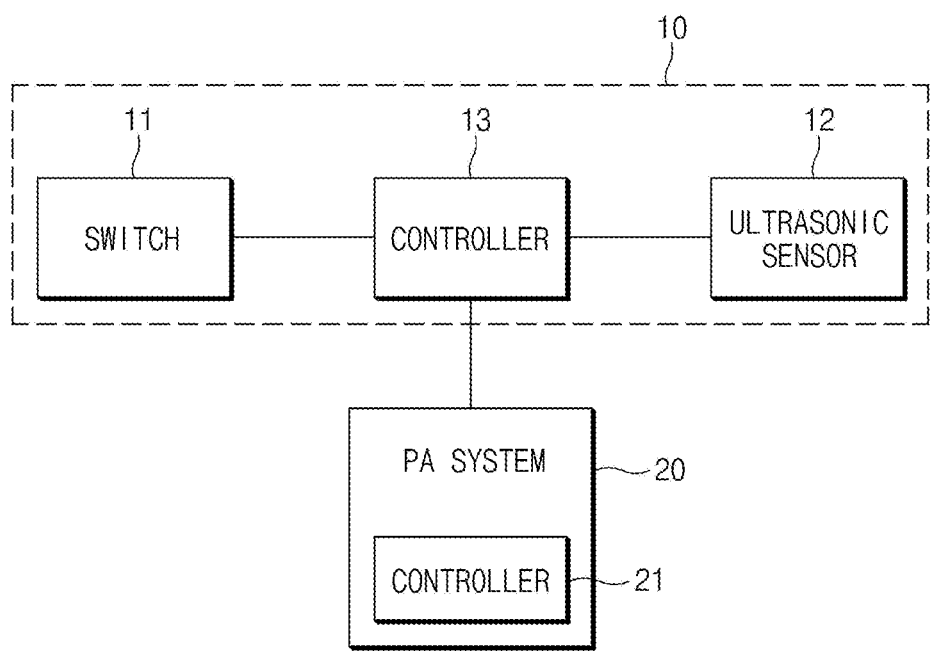
FIG. 1 is a block diagram showing a sensor-based parking space searching system according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In describing elements of exemplary embodiments of the present invention, the terms $1^{st}$ $2^{nd}$ first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram showing a sensor-based parking space searching system according to an exemplary embodiment of the present invention.

Referring to FIG. 1, the sensor-based parking space searching system according to an exemplary embodiment of the present invention may include a parking space searching apparatus 10 and a parking assist (PA) system 20. The parking space searching apparatus 10 may include a switch 11, an ultrasonic sensor 12, and a controller 13.

Hereinafter, each component of the parking space searching apparatus 10 will be described in detail. The switch 11 may receive a request from a driver to search for a parking space. That is, the driver may turn on the switch 11 to activate the parking space searching apparatus 10.

The switch 11 is configured as a switch for activating the parking space searching apparatus 10 by an "On or off" operation thereof. The switch 11 may be implemented by one of an electronic switch and a mechanical switch.

In addition, the switch 11 may be disposed at one of a center fascia of a vehicle, a spoke of a steering wheel, and a left dashboard of the steering wheel to allow the driver to easily operate the switch 11.

The ultrasonic sensor 12 may be disposed at a side portion of the vehicle and measure a distance between the vehicle and an obstacle using an ultrasonic wave to search for the parking space. The ultrasonic sensor 12 may be implemented by, for example, two long-range ultrasonic sensors and ten short-range ultrasonic sensors.

Hereinafter, a process of searching for the parking space by the ultrasonic sensor 12 will be described in detail with reference to FIG. 2.

Figure 2:
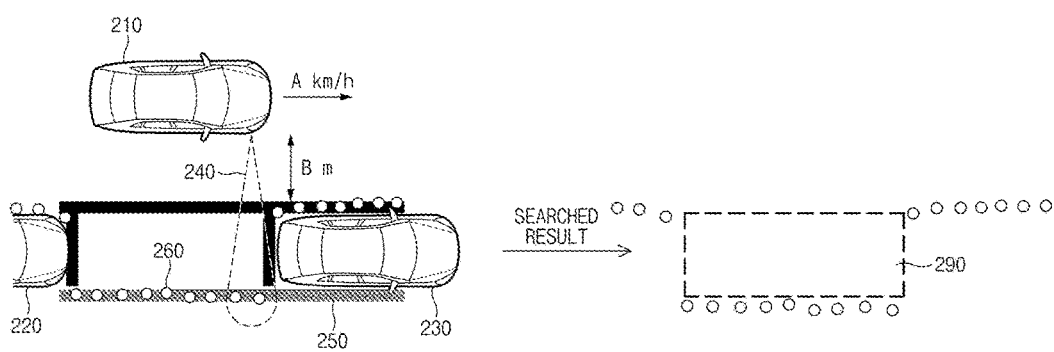
FIG. 2 is a view showing a process of searching for a parking space by an ultrasonic sensor according to an exemplary embodiment of the present invention.

FIG. 2 is a view showing the process of searching for the parking space by the ultrasonic sensor 12 according to an exemplary embodiment of the present invention, and the process shown in FIG. 2 may be applied to a vehicle not only in a parallel parking mode but also in a right angle parking mode.

In FIG. 2, a reference numeral "210" may indicate an ego-vehicle at which the ultrasonic sensor 12 searching for the parking space is disposed, and reference numerals "220" and 230" may indicate vehicles that are already parked. In a case that the driver turns on the switch 11, the controller 13 may activate the ultrasonic sensor 12, and the activated ultrasonic sensor 12 detects an obstacle within a predetermined detecting area 240 while moving with the ego-vehicle at a predetermined speed (A km/h). Detecting points obtained by the above-mentioned process is indicated by a reference numeral "260". In the instant case, the ultrasonic sensor 12 may obtain detecting points of a kerb 250 positioned at an end portion of the parking space in addition to the detecting points with respect to the ego-vehicle 210 and the already-parked vehicles 220 and 230. Then, the controller 13 may recognize the parking space based on the detecting points obtained by the ultrasonic sensor 12. The parking space is indicated by a reference numeral 290.

The controller 13 may perform a control operation to allow each of the components to normally perform its function.

In more detail, when the switch 11 is turned on, i.e., when the controller 13 is requested to search for the parking space by the driver, the controller 13 may activate the ultrasonic sensor 12 to measure the distance from the already-parked vehicle to the ego-vehicle. In the instant case, since the switch 11 is turned on at the point where the already-parked vehicle is located, the controller 13 may recognize the distance measured right after the ultrasonic sensor 12 is activated as the distance from the already-parked vehicle to the ego-vehicle.

In addition, in a case that the distance from the already-parked vehicle to the ego-vehicle does not exceed a critical distance, for example, about 1.5 m, the controller 13 may generate a control signal to set a first reference speed (e.g., about 20 kph) as a speed of the ego-vehicle, transmit the control signal to the PA system 20, and set a first reference value ($\alpha$) used to detect an effective detecting point among the detecting points obtained by the ultrasonic sensor 12 as a reference value of the ultrasonic sensor 12. In the present exemplary embodiment, the first reference value ($\alpha$) may be a voltage value.

Further, in a case that the distance from the already-parked vehicle to the ego-vehicle exceeds the critical distance, the controller 13 may generate a control signal to set the speed of the ego-vehicle to a second reference speed (e.g., about 10 kph), transmit the control signal to the PA system 20, and set a second reference value ($\beta$) as the reference value of the ultrasonic sensor 12. In the present exemplary embodiment, the first reference value ($\alpha$) may have a value (a voltage value) greater than that of the second reference value ($\beta$).

Hereinafter, a detecting signal (a set of effective detecting points) obtained by the ultrasonic sensor 12 depending on the distance from the already-parked vehicle to the ego-vehicle will be described with reference to FIG. 3.

Figure 3:
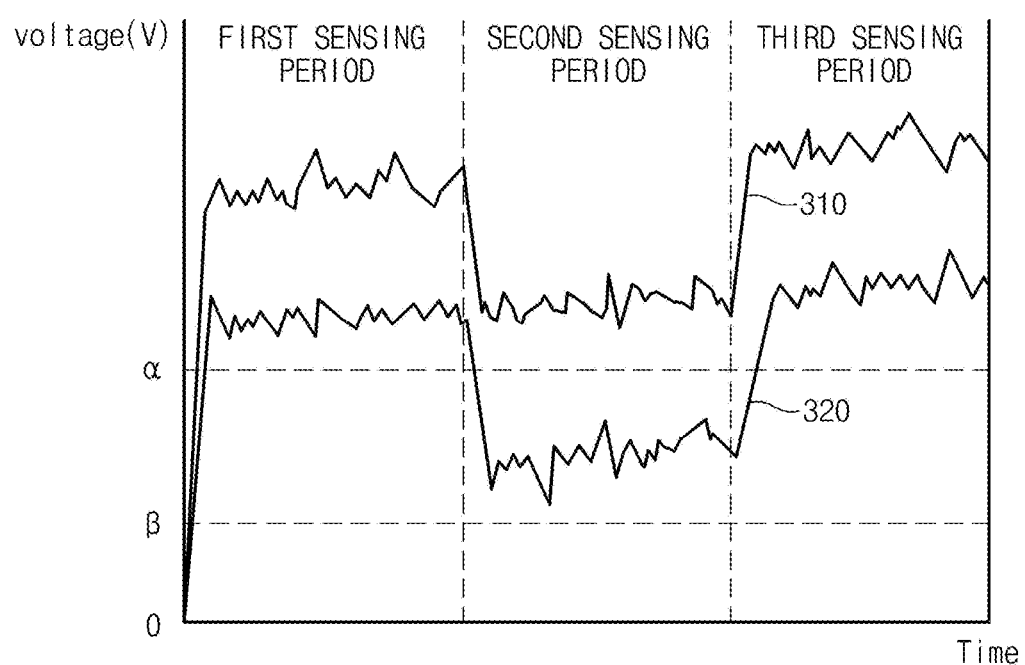
FIG. 3 is a view showing a detecting signal obtained by the ultrasonic sensor depending on a distance from a vehicle that is already parked according to an exemplary embodiment of the present invention.

In FIG. 3, a reference numeral "310" may indicate the detecting signal obtained in the case where the distance from the already-parked vehicle to the ego-vehicle does not exceed the critical distance, and a reference numeral "320" may indicate the detecting signal in the case where the distance from the already-parked vehicle to the ego-vehicle exceeds the critical distance. In the instant case, a first detecting signal 310 and a second detecting signal 320 may be signals configured to include the effective detecting points.

In addition, a first detecting period may indicate a period in which a first vehicle 220 is located, a second detecting period may indicate a period in which the kerb 250 positioned at the end portion of the parking space is detected while no vehicle is parked in the parking space, and a third detecting period may indicate a period in which a second vehicle 230 is located.

In a case that the first reference value ($\alpha$) is set as the reference value of the ultrasonic sensor 12, all effective detecting points may be detected with respect to the first detecting signal 310, and thus the parking space may be normally searched. However, since the effective detecting points of the second detecting period may not be detected with respect to the second detecting signal 320, the parking space may not be normally searched. That is, the ultrasonic sensor 12 may not detect whether an obstacle exists in the parking space or not.

Accordingly, in the case that the distance from the already-parked vehicle to the ego-vehicle exceeds the critical distance, the controller 13 may set the second reference value ($\beta$) as the reference value of the ultrasonic sensor 12, and thus the effective detecting points may be normally detected in the second detecting period.

In addition, after the speed of the ego-vehicle and the reference value of the ultrasonic sensor 12 are set, the controller 13 may search for and recognize the parking space for the ego-vehicle based on an output (effective detecting point) of the ultrasonic sensor 12.

Meanwhile, the PA system 20 may perform an overall control associated with driving, braking, and steering of the ego-vehicle to automatically park the ego-vehicle in the parking space searched by the parking space searching apparatus 10.

The PA system 20 may control a driving speed of the ego-vehicle based on the speed of the ego-vehicle, which is set by the parking space searching apparatus 10.

According to the exemplary embodiment of the present invention, the parking space searching apparatus 10 is provided separate from the PA system 20, but the parking space searching apparatus 10 may be implemented in the PA system 20. That is, the PA system 20 may be implemented such that the function of the controller 13 is performed by the controller 21 of the PA system 20. In the instant case, the switch 11 may perform a function for turning on or off the activation of the PA system 20.

Figure 4:
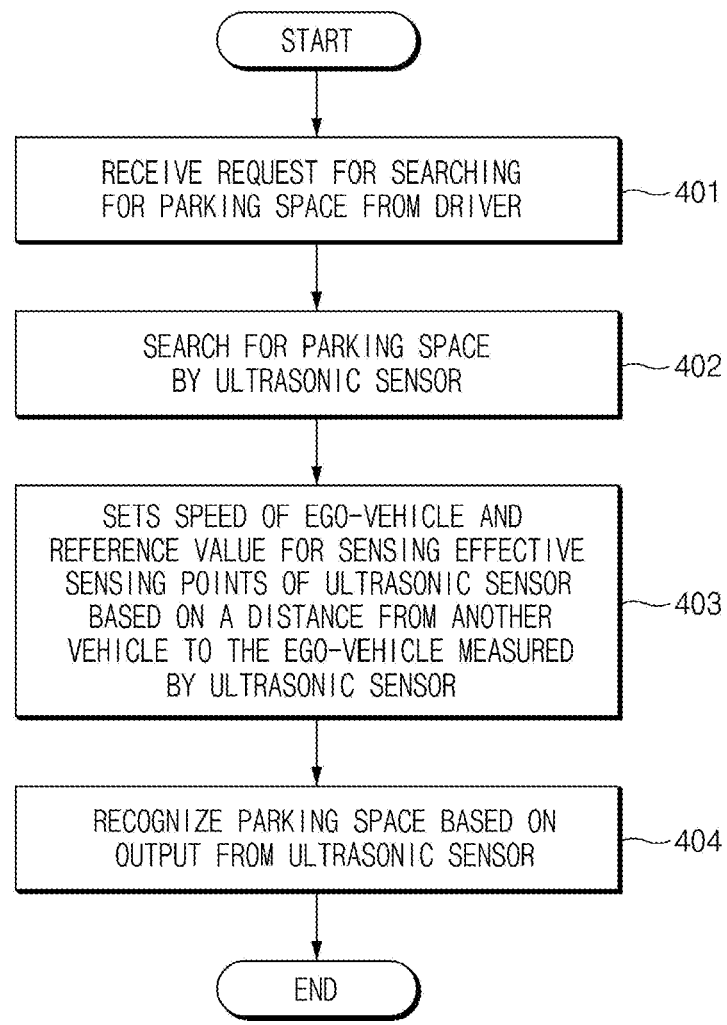
FIG. 4 is a flowchart showing a sensor-based parking space searching method according to an exemplary embodiment of the present invention.

FIG. 4 is a flowchart showing a sensor-based parking space searching method according to an exemplary embodiment of the present invention.

First, the switch 11 receives the request from the driver to search for the parking space 401.

Then, the ultrasonic sensor 12 searches for the parking space 402.

The controller 13 sets the speed of the ego-vehicle and the reference value for detecting the effective detecting points of the ultrasonic sensor 12 based on a distance from an object in the parking space to the ego-vehicle, which is measured by the ultrasonic sensor 12 403. Here, in the case that the distance from the object (e.g., the already-parked another vehicle) to the ego-vehicle does not exceed the critical distance, the controller 13 sets the first reference speed as the speed of the ego-vehicle and sets the first reference value ($\alpha$) as the reference value. In addition, in the case that the distance from the another vehicle to the ego-vehicle exceeds the critical distance, the controller 13 sets the second reference speed as the speed of the ego-vehicle and sets the second reference value ($\beta$) as the reference value. In the present exemplary embodiment, the first reference speed is faster than the second reference speed, and the first reference value ($\alpha$) is greater than the second reference value ($\beta$).

Then, the controller 13 recognizes the parking space based on the output from the ultrasonic sensor 12 in which the reference value is set 404.

Meanwhile, the present invention may be applied to not only the PA system but also a remote smart parking assist (RSPA) system.

According to the above-described present invention, the speed of the ego-vehicle and a sensitivity of the ultrasonic sensor disposed at the ego-vehicle are controlled based on the distance, i.e., the separation distance, between the ego-vehicle and the already-parked vehicle when searching for the parking space. Accordingly, the parking space may be normally searched even though the driver does not take into account the speed of the ego-vehicle and the separation distance.

While the present invention has been described with reference to exemplary embodiments, it will be apparent to those skilled in the art that various changes and modifications may be made without departing from the spirit and scope of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sensor-based parking space searching system comprising:
    a switch configured to receive a request for searching for a parking space from a driver;
    an ultrasonic sensor configured to search for the parking space;
    a controller configured to activate the ultrasonic sensor in response to the request for searching for the parking space, set a speed of an ego-vehicle and a predetermined value for detecting a detecting point of the ultrasonic sensor based on a distance from a parked vehicle to the ego-vehicle, which is measured by the ultrasonic sensor, and recognize the parking space based on an output of the ultrasonic sensor; and
    wherein the controller is configured to set a first reference speed as the speed of the ego-vehicle and set a first predetermined value (a) as the predetermined value when the distance from the parked vehicle to the ego-vehicle does not exceed a predetermined distance.

2. The sensor-based parking space searching system of claim 1, wherein the controller is configured to set a second reference speed as the speed of the ego-vehicle and set a second predetermined value ((3) as the predetermined value when the distance from the another vehicle to the ego-vehicle exceeds the predetermined distance.

3. The sensor-based parking space searching system of claim 2, wherein the first reference speed is greater than the second reference speed, and the first predetermined value (α) is greater than the second predetermined value (β).

4. The sensor-based parking space searching system of claim 2, wherein the controller is configured to set the second reference speed as the speed of the ego-vehicle and set the second predetermined value ((3) as the predetermined value to detect the kerb disposed at an end portion of the parking space.

5. The sensor-based parking space searching system of claim 1, wherein the switch is disposed at one of a center fascia of the ego-vehicle, a spoke of a steering wheel, and a left dashboard of the steering wheel.

6. A sensor-based parking space searching method comprising: allowing a switch to receive a request for searching for a parking space from a driver;
    allowing an ultrasonic sensor to search for the parking space;
    allowing a controller to set a speed of an ego-vehicle and a predetermined value for detecting a detecting point of the ultrasonic sensor based on a distance from a parked vehicle to the ego-vehicle, which is measured by the ultrasonic sensor;
    setting a first reference speed as the speed of the ego-vehicle and a first predetermined value (a) as the predetermined value when the distance from the parked vehicle to the ego-vehicle does not exceed a predetermined distance; and
    setting a second reference speed as the speed of the ego-vehicle and a second predetermined value ((3) as the predetermined value when the distance from the parked vehicle to the ego-vehicle exceeds the predetermine distance;
    wherein controller is configured set a value to detect a kerb disposed at an end portion of the parking space; and
    allowing the controller to recognize the parking space based on an output of the ultrasonic sensor in which the predetermined value is set.

7. The method of claim 6, wherein the first reference speeds greater than the second reference speed, and the first predetermined value (a) is greater than the second predetermined value ((3).

8. The method of claim 6, wherein the setting of the second predetermined value as the predetermined value includes setting the second reference speed as the speed of the ego-vehicle and the second predetermined value ((3) as the predetermined value to detect a kerb disposed at an end portion of the parking space.

9. A sensor-based parking space searching system comprising:
    a parking space searching apparatus configured to activate an ultrasonic sensor in response to a request for searching for a parking space from a driver, set a speed of an ego-vehicle and a predetermined value for detecting a detecting point of the ultrasonic sensor based on a distance from a parked vehicle to the ego-vehicle, which is measured by the ultrasonic sensor, and recognize the parking space based on an output of the ultrasonic sensor;
    wherein the parking space searching apparatus is configured to set a first reference speed as the speed of the ego-vehicle and set a first predetermined value (a) as the predetermined value when the distance from the another vehicle to the ego-vehicle does not exceed a predetermined distance;
    wherein controller is configured set a value to detect a kerb disposed at an end portion of the parking space; and a parking assist (PA) system configured to control a driving speed of the ego-vehicle based on the speed of the ego-vehicle set by the parking space searching apparatus.

10. The sensor-based parking space searching system of claim 9, wherein the parking space searching apparatus is configured to set a second reference speed as the speed of the ego-vehicle and set a second predetermined value (($\beta$) as the predetermined value when the distance from the another vehicle to the ego-vehicle exceeds the predetermined distance.

11. The sensor-based parking space searching system of claim 10, wherein the first reference speed is greater than the second reference speed, and the first predetermined value ($\alpha$) is greater than the second predetermined value ($\beta$).

12. The sensor-based parking space searching system of claim 10, wherein the parking space searching system is configured to set the second reference speed as the speed of the ego-vehicle and set the second predetermined value (($\beta$) as the predetermined value to detect the kerb disposed at an end portion of the parking space.

13. The sensor-based parking space searching system of claim 9, wherein the parking space searching apparatus includes:
   a switch configured to receive the request for searching for the parking space from the driver;
   the ultrasonic sensor configured to search for the parking space; and
   a controller configured to activate the ultrasonic sensor in response to the request for searching for the parking space, set the speed of the ego-vehicle and the predetermined value for detecting the detecting point of the ultrasonic sensor based on the distance from the object to the ego-vehicle, which is measured by the ultrasonic sensor, and recognize the parking space based on the output of the ultrasonic sensor.

14. The sensor-based parking space searching system of claim 13, wherein the switch is disposed at one of a center fascia of the ego-vehicle, a spoke of a steering wheel, and a left dashboard of the steering wheel.

\* \* \* \* \*